United States Patent
Masuda et al.

(10) Patent No.: US 11,890,671 B2
(45) Date of Patent: Feb. 6, 2024

(54) CONTROL METHOD FOR CONTINUOUS CASTING MACHINE, CONTROL DEVICE FOR CONTINUOUS CASTING MACHINE, AND MANUFACTURING METHOD FOR CASTING

(71) Applicant: JFE STEEL CORPORATION, Tokyo (JP)

(72) Inventors: Ryosuke Masuda, Tokyo (JP); Yoshinari Hashimoto, Tokyo (JP); Akitoshi Matsui, Tokyo (JP); Shugo Morita, Tokyo (JP); Tatsuro Hayashida, Tokyo (JP); Taiga Koriyama, Tokyo (JP); Ryo Morishita, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 296 days.

(21) Appl. No.: 17/422,674

(22) PCT Filed: Feb. 6, 2020

(86) PCT No.: PCT/JP2020/004546
§ 371 (c)(1),
(2) Date: Jul. 13, 2021

(87) PCT Pub. No.: WO2020/170836
PCT Pub. Date: Aug. 27, 2020

(65) Prior Publication Data
US 2021/0387250 A1   Dec. 16, 2021

(30) Foreign Application Priority Data
Feb. 19, 2019  (JP) .................................. 2019-027374
Dec. 11, 2019  (WO) .................. PCT/JP2019/048374

(51) Int. Cl.
*B22D 11/18*   (2006.01)
*B22D 11/115*   (2006.01)
*G05B 15/02*   (2006.01)

(52) U.S. Cl.
CPC ............ *B22D 11/18* (2013.01); *B22D 11/115* (2013.01); *G05B 15/02* (2013.01)

(58) Field of Classification Search
CPC ..... B22D 11/18; B22D 11/115; B22D 11/111; B22D 11/182; B22D 11/186; B22D 11/16; B22D 37/00; G05B 15/02
See application file for complete search history.

(56) References Cited

U.S. PATENT DOCUMENTS 5,884,685 A   3/1999   Umezawa et al.
6,378,743 B1   4/2002   Kagan
(Continued)

FOREIGN PATENT DOCUMENTS

CN   1152267 A   6/1997
CN   102413963 A   4/2012
(Continued)

OTHER PUBLICATIONS

Jul. 18, 2021 Office Action issued in Chinese Patent Application No. 202080013723.9.
(Continued)

*Primary Examiner* — Mohammad Ali
*Assistant Examiner* — Sheela Rao
(74) *Attorney, Agent, or Firm* — Oliff PLC (57) ABSTRACT

A control method for a continuous casting machine, includes: estimating, by on-line real-time system, a flow state of molten steel in a mold by using an operation condition of a continuous casting machine and temperature data on the molten steel in the mold; calculating, by on-line real-time system, a molten steel flow index based on the
(Continued)

estimated flow state of the molten steel, the molten steel flow index being a factor of mixing of an impurity into a casting inside the mold; and controlling the operation condition of the continuous casting machine such that the calculated molten steel flow index is within an appropriate range.

14 Claims, 8 Drawing Sheets

(56) References Cited

U.S. PATENT DOCUMENTS

| | | | |
|---|---|---|---|
| 2002/0079083 A1* | 6/2002 | Suzuki | B22D 11/16 164/466 |
| 2009/0242165 A1 | 10/2009 | Beitelman et al. | |
| 2011/0174457 A1* | 7/2011 | Abraham | C21C 7/0075 164/4.1 |
| 2012/0291982 A1 | 11/2012 | Miki et al. | |
| 2013/0233505 A1 | 9/2013 | Miki et al. | |
| 2014/0081420 A1 | 3/2014 | Herr et al. | |
| 2014/0299288 A1 | 10/2014 | Eriksson et al. | |
| 2017/0219932 A1 | 8/2017 | Bittner et al. | |
| 2018/0001041 A1 | 1/2018 | Albanese et al. | |
| 2018/0354023 A1 | 12/2018 | Cordill et al. | |
| 2021/0283679 A1* | 9/2021 | Yamamoto | B22D 46/00 |

FOREIGN PATENT DOCUMENTS

| | | |
|---|---|---|
| EP | 3167976 A1 | 5/2017 |
| JP | H10-305353 A | 11/1998 |
| JP | 2002-096147 A | 4/2002 |
| JP | 2005-152996 A | 6/2005 |
| JP | 2011-206845 A | 10/2011 |
| JP | 2013-503026 A | 1/2013 |
| JP | 2014-032719 A | 2/2014 |
| JP | 2016-016414 A | 2/2016 |
| JP | 2017-159363 A | 9/2017 |
| JP | 2017-536579 A | 12/2017 |
| JP | 2018-506354 A | 3/2018 |
| RU | 2 256 279 C2 | 7/2005 |
| RU | 65 799 U1 | 8/2007 |
| RU | 2 453 395 C1 | 6/2012 |
| RU | 2 520 891 C2 | 6/2014 |
| RU | 2 574 556 C1 | 2/2016 |
| TW | 201012570 A | 4/2010 |

OTHER PUBLICATIONS

Mar. 3, 2022 extended Search Report issued in European Patent Application No. 20759007.6.
Mar. 3, 2020 International Search Report issued in International Patent Application No. PCT/JP2020/004546.
Dec. 28, 2020 Office Action issued in Taiwan Patent Application No. 109105112.

* cited by examiner

CONTROL METHOD FOR CONTINUOUS CASTING MACHINE, CONTROL DEVICE FOR CONTINUOUS CASTING MACHINE, AND MANUFACTURING METHOD FOR CASTING

FIELD

The present invention relates to a control method for a continuous casting machine, a control device for a continuous casting machine, and a manufacturing method for a casting.

BACKGROUND

A demand for improvement in the quality of castings, such as slabs, produced with a continuous casting machine has recently been growing. Techniques have thus been developed for controlling the state of molten steel in molds of continuous casting machines. For example, Patent Literature 1 discloses a method of applying a magnetic field to molten steel in a mold. A magnetic field is applied to molten steel in a mold to control the flow of the molten steel, whereby the quality of castings can be stabilized. Unfortunately, even if a magnetic field is applied to the molten steel, unexpected variation in operation makes it difficult to fully control the flow of the molten steel. Thus, a technique has been proposed for controlling operation by additionally using a result of measurement of the temperature of molten steel with a temperature measuring element embedded in a mold copper plate. For example, Patent Literature 2 discloses a method of highly accurately estimating the flow of molten steel by correcting the flow of the molten steel in a mold on the basis of data on copper plate temperature in the mold.

One quality required for castings is to have less defects caused by impurities, such as bubbles and inclusions, mixed in the vicinities of casting surfaces. In a continuous casting machine, molten steel poured through a submerged entry nozzle into a mold starts to be solidified from the mold wall surface side into a shell shape (hereinafter, steel solidified into a shell shape is referred to as a solidified shell), and as the casting progresses, a thickness of the solidified shell increases. Bubbles and inclusions are suspended in the molten steel poured in the mold, and if the solidification progresses with these bubbles and inclusions trapped in the solidified shell, the aforementioned defects occur.

It is known that as the molten steel flow velocity at the solidification interface increases, it becomes more difficult for the bubbles and inclusions suspended in the molten steel to be trapped in the solidified shell, and a technique has been developed from this viewpoint for properly controlling the flow of molten steel in a mold. For example, Patent Literature 3 discloses a technique for, in the case of a relatively low casting speed of approximately 1.6 m/min or the like, reducing the occurrence of defects caused by an insufficient molten steel flow velocity at a solidification interface. In specific, this technique controls a position of a discharge port and a discharge angle of the submerged entry nozzle relative to a position at which the moving magnetic field is applied, within appropriate ranges, when continuous casting is performed while a moving magnetic field is applied so that a braking force is applied to a discharge flow of molten steel discharged from a submerged entry nozzle.

CITATION LIST

Patent Literature

Patent Literature 1: Japanese Patent Application Laid-open No. H10-305353
Patent Literature 2: Japanese Patent Application Laid-open No. 2016-16414
Patent Literature 3: Japanese Patent Application Laid-open No. 2005-152996

SUMMARY

Technical Problem

Patent Literature 2 discloses a method of highly accurately estimating the flow of molten steel in a mold but does not disclose or suggest estimating a molten steel flow index indicating a factor of mixing of impurities into a casting inside a mold and controlling the molten steel flow index within an appropriate range. To produce a high-quality casting, it is required to estimate the molten steel flow index indicating a factor of mixing of impurities into a casting inside a mold and to control the molten steel flow index within an appropriate range. It is thus difficult to produce a high-quality casting only by the method disclosed in Patent Literature 2.

On the other hand, Patent Literature 3 discloses a method of controlling the molten steel flow velocity at a solidification interface within an appropriate range, and this appropriate range is defined on the basis of only the geometric relation with the equipment. Unfortunately, in actual continuous casting, there is a factor causing variation in the molten steel flow velocity, such as an uneven flow generated by inclusions adhering to a nozzle hole of a submerged entry nozzle. Even if such variations occur, it is necessary to perform control so that the molten steel flow velocity at the solidification interface is within the appropriate range in accordance with the variation state. That is, a decrease in the molten steel flow velocity at the solidification interface, which is a factor of mixing of impurities such as bubbles and inclusions into a casting inside a mold, is estimated as a molten steel flow index by using an operation condition of a continuous casting machine and temperature data on the molten steel in the mold, and by exercising control so that the molten steel flow index is within an appropriate range on the basis of a result of the estimation, a casting having higher quality can be produced.

The present invention is made in the light of the foregoing problems, and an object of the present invention is to provide a control method for a continuous casting machine, a control device for a continuous casting machine, and a manufacturing method for a casting that enable production of high-quality castings.

Solution to Problem

To solve the problem and achieve the object, a control method for a continuous casting machine, according to the present invention includes: a molten steel flow state estimating step of estimating, by on-line real-time system, a flow state of molten steel in a mold by using an operation condition of a continuous casting machine and temperature data on the molten steel in the mold; a molten steel flow index calculating step of calculating, by on-line real-time system, a molten steel flow index based on the flow state of the molten steel estimated at the molten steel flow state estimating step, the molten steel flow index being a factor of mixing of an impurity into a casting inside the mold; and an operation condition controlling step of controlling the operation condition of the continuous casting machine such that the molten steel flow index calculated at the molten steel flow index calculating step is within an appropriate range.

Moreover, in the control method for the continuous casting machine according to the present invention, the molten steel flow index includes an area of a region where the flow velocity is equal to or less than a predetermined value in a stirred flow generated by an electromagnetic stirring magnetic field.

Moreover, in the control method for the continuous casting machine according to the present invention, the molten steel flow index includes a speed or a flow state at a surface of the molten steel.

Moreover, in the control method for the continuous casting machine according to the present invention, the molten steel flow index includes an area of a region where a solidification interface flow velocity is equal to or less than a predetermined value.

Moreover, in the control method for the continuous casting machine according to the present invention, the molten steel flow index includes a maximum value of a molten steel surface flow velocity.

Moreover, in the control method for the continuous casting machine according to the present invention, the molten steel flow index includes a maximum value of molten steel surface turbulence energy.

Moreover, in the control method for the continuous casting machine according to the present invention, the temperature data on the molten steel in the mold is temperature data including a measurement value from a temperature sensor mounted on the mold.

Moreover, in the control method for the continuous casting machine according to the present invention, the operation condition of the continuous casting machine includes at least one of a casting speed, magnetic flux density of the electromagnetic stirring magnetic field, and a nozzle submerging depth.

Moreover, in the control method for the continuous casting machine according to the present invention, the operation condition controlling step includes a step of calculating sensitivity of the flow state of the molten steel with respect to change in the operation condition by estimating, for each control cycle, the flow state of the molten steel when at least one of the casting speed, the magnetic flux density of the electromagnetic stirring magnetic field and the nozzle submerging depth is varied slightly.

Moreover, in the control method for the continuous casting machine according to the present invention, the operation condition controlling step includes a step of performing control by explicitly calculating mutual interference among the casting speed, the magnetic flux density of the electromagnetic stirring magnetic field, and the nozzle submerging depth.

Moreover, a control device for a continuous casting machine, according to the present invention includes: a molten steel flow state estimator configured to estimate, by on-line real-time system, a flow state of molten steel in a mold by using an operation condition of a continuous casting machine and temperature data on the molten steel in the mold; a molten steel flow index calculator configured to calculate, by on-line real-time system, a molten steel flow index based on the flow state of the molten steel estimated by the molten steel flow state estimator, the molten steel flow index being a factor of mixing of an impurity into a casting inside the mold; and an operation condition controller configured to control the operation condition of the continuous casting machine such that the molten steel flow index calculated by the molten steel flow index calculator is within an appropriate range.

Moreover, a manufacturing method for a casting, according to the present invention includes a step of producing a casting while controlling a continuous casting machine by using the control method for the continuous casting machine according to the present invention.

Advantageous Effects of Invention

According to the present invention, the control method for the continuous casting machine, the control device for the continuous casting machine, and the manufacturing method for the casting enable production of high-quality castings.

DESCRIPTION OF EMBODIMENTS

A configuration and workings of a control device of a continuous casting machine according to one embodiment of the present invention will be described below with reference to the drawings.

[Configuration of Continuous Casting Machine]

First, with reference to FIG. 1, an example configuration of the continuous casting machine to which the present invention is applied will be described.

Figure 1:
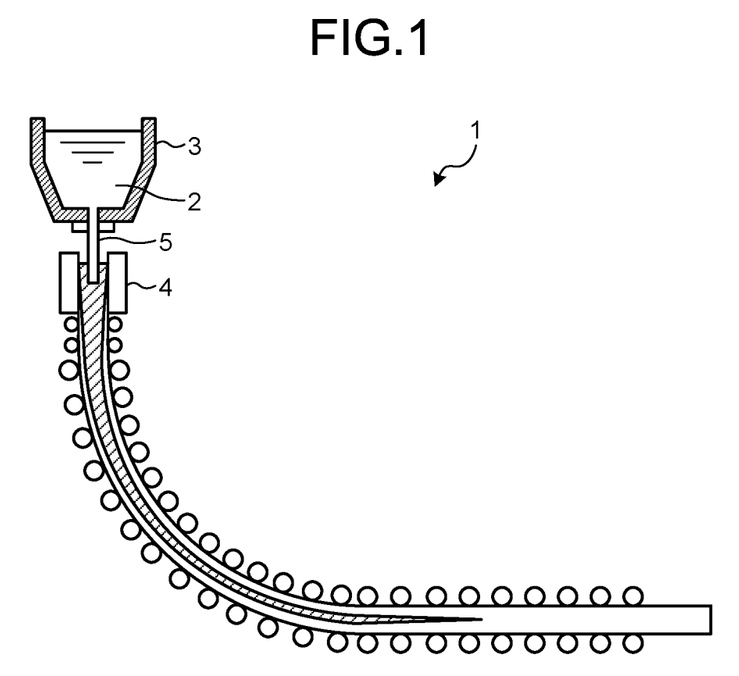
FIG. 1 is a schematic view illustrating an example configuration of a continuous casting machine to which the present invention is applied.

FIG. 1 is a schematic view illustrating the example configuration of the continuous casting machine to which the present invention is applied. As illustrated in FIG. 1, in the continuous casting machine 1, a mold 4 is disposed vertically below a tundish 3 filled with molten steel 2, and a submerged entry nozzle 5 is disposed at the bottom of the tundish 3 and serves as a port for supplying the molten steel 2 to the mold 4. The molten steel 2 is continuously poured from the tundish 3 into the mold 4, is cooled by the mold 4 provided therein with a water channel for cooling water, and is drawn out from the lower part of the mold 4, so as to form a slab. At this time, to balance the weight of the molten steel 2 poured into the mold 4 and the weight of the drawn-out slab, the degree of opening of the submerged entry nozzle 5 is adjusted in accordance with the drawn-out speed using a sliding gate nozzle or the like, which is not illustrated, disposed immediately above the submerged entry nozzle 5. The mold 4 is provided with a plurality of temperature sensors mounted on a face F and a face B located at both ends in the thickness direction of a slab to be cast. Each of the temperature sensors measures temperature of the molten steel 2 in the corresponding mounted position. The mold 4 is also provided with a coil, which is not illustrated, generating an electromagnetic stirring magnetic field inducing a stirred flow in the molten steel 2 inside the mold 4.

[Configuration of Control Device]

Next, with reference to FIG. 2, a configuration of the control device of the continuous casting machine according to the one embodiment of the present invention will be described.

Figure 2:
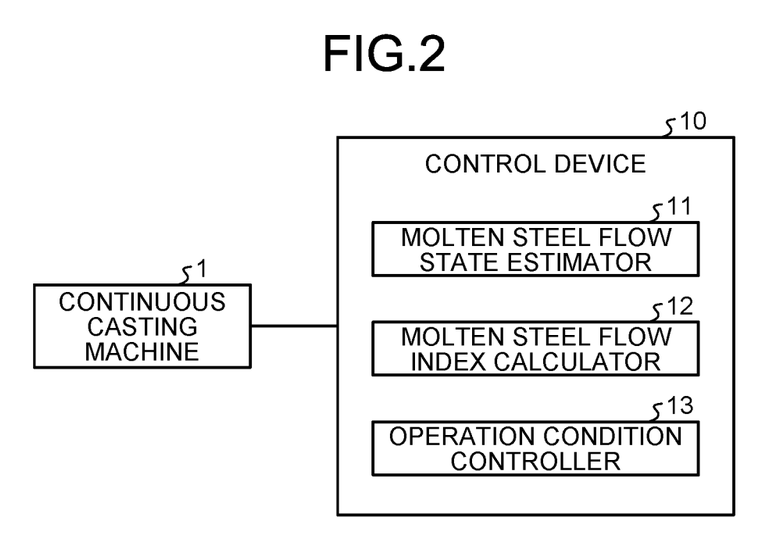
FIG. 2 is a block diagram illustrating a configuration of a control device of the continuous casting machine according to one embodiment of the present invention.

FIG. 2 is a block diagram illustrating the configuration of the control device of the continuous casting machine according to the one embodiment of the present invention. As illustrated in FIG. 2, the control device 10 of the continuous casting machine according to the one embodiment of the present invention is configured by an information processing device, such as a computer, and functions as a molten steel flow state estimator 11, a molten steel flow index calculator 12, and an operation condition controller 13 by executing a computer program by an inside arithmetic processing unit such as a central processing unit (CPU).

The molten steel flow state estimator 11 utilizes a known technique such as the method of estimating the flow state of molten steel disclosed in Patent Literature 2, so as to estimate the flow state of the molten steel 2 in the mold 4 by on-line real-time system. In specific, the molten steel flow state estimator 11 uses a physical model of numerical hydrodynamics or the like in consideration of a turbulence model to estimate, by on-line real-time system, the flow state of the molten steel 2 in the mold 4 from operation conditions of the continuous casting machine 1 and measurement values from the temperature sensors mounted on the mold 4. The operation conditions of the continuous casting machine 1 include, for example, a casting width, a casting speed, the magnetic flux density of the electromagnetic stirring magnetic field, and the submerging depth of the submerged entry nozzle 5 (nozzle submerging depth).

The molten steel flow index calculator 12 uses data on the flow state of the molten steel 2 estimated by the molten steel flow state estimator 11 to estimate, by on-line real-time system, molten steel flow indices indicating factors of mixing of impurities into the slab (casting) inside the mold 4. Impurities mixed into the slab include inclusions of mold powder origin. The mold powder is always supplied to the top surface of the molten steel poured into the mold 4, is a lubricant for preventing seizure between the mold 4 and the slab, and has an effect of retaining temperature of the molten steel 2 and the like. At the uppermost part of the molten steel 2 in the mold 4, the mold powder in a molten state comes into contact with the molten steel 2, and the molten steel 2 flows at a certain flow velocity. Herein, in the present invention, the flow velocity of the molten steel 2 in the position of contact with the mold powder is referred to as a surface flow velocity of the molten steel 2. Thus, if the molten steel 2 has an excessive surface flow velocity, the molten powder may be caught inside the molten steel 2, causing an inclusion defect. Furthermore, inclusions such as alumina move up with the flow of the molten steel together with bubbles of Ar gas or the like supplied from the submerged entry nozzle 5 and are absorbed into a molten powder layer, whereby the molten steel 2 is clarified. However, with a low solidification interface flow velocity, the inclusions and the bubbles may be trapped on a solidified shell side, causing a surface defect in a product. Herein, the solidification interface flow velocity indicates a flow velocity of the molten steel in a region in the vicinity of the solidified shell in the mold.

Thus, the molten steel flow indices indicating factors of mixing of impurities into the slab inside the mold 4 include, for example, the maximum value of the molten steel surface flow velocities in the mold 4 (maximum molten steel surface flow velocity), an area of a region where the solidification interface flow velocity is equal to or less than a predetermined value (low-flow-velocity area), and the maximum value of molten steel surface turbulence energy. In specific, the molten steel flow index calculator 12 calculates, from the data on the flow state of the molten steel 2, the maximum value of the molten steel flow velocities in a molten steel flow state calculation mesh (the entire region in a width direction and the thickness direction) at the top part (meniscus: the height position of the surface of the molten steel) of the mold 4, as the maximum molten steel surface flow velocity. Furthermore, the molten steel flow index calculator 12 calculates, from the data on the flow state of the molten steel 2, an area of the molten steel flow state calculation mesh where the molten steel flow velocity is equal to or less than the predetermined value, in the molten steel flow state calculation mesh (the entire region in the width direction) in a predetermined position in a height direction (casting direction) and the thickness direction of the mold 4. For example, the molten steel flow index calculator 12 calculates, for each long side of the mold, the sum of areas of the molten steel flow state calculation mesh where the molten steel flow velocity is equal to or less than the predetermined value in the entire region in the width direction and at least in the range from the meniscus position to the depth of 200 mm in the mold height direction, and determines the value as the low-flow-velocity area. Furthermore, the molten steel flow index calculator 12 calculates, from the data on the flow state of the molten steel 2, the maximum value of turbulence energy in the molten steel flow state calculation mesh (the entire region in the width direction and the thickness direction) at the top part of the mold 4, as the maximum value of the molten steel surface turbulence energy.

Herein, the turbulence energy indicates a value of the magnitude of turbulence of a flow and is obtained on the basis of the degree of a deviation from the time average value of a temporally varying flow velocity in a certain spatial position. In specific, the turbulence energy is obtained by the following equations.

$$k = (1/2) \cdot U_i^2$$

$$U = U_{ave} = U_i$$

In the equations, k is turbulence energy, U is an instantaneous value of the flow velocity of a fluid in a certain spatial position, $U_{ave}$ is a time average value of the flow velocity of the fluid in the certain spatial position, and Ui is a deviation from the time average value of the flow velocity of the fluid in the certain spatial position.

The low-flow-velocity area is an effective index because a fast flow of the molten steel at the solidification interface of the slab produces an effect of reducing impurities (bubbles and inclusions) trapped in the solidified shell by the molten steel 2. The flow velocity to be determined as a low flow velocity may be set for each case depending on compositions of a steel type, a required quality level, mold dimensions, and the like, and should not be set at a fixed value. Note that research by the inventors has found that a flow velocity less than 0.05 m/s can be determined as a low flow velocity as a guide. Furthermore, for example, in a case where the unit area of the molten steel flow state calculation mesh is 1 cm$^2$ (0.0001 m$^2$), when there are 100 unit meshes that are determined to have low flow velocities on one long side of the mold, the low-flow-velocity area is 0.01 m$^2$. Furthermore, an appropriate value of the low-flow-velocity area may be set individually depending on the compositions of the steel type, the required quality level, the mold dimensions, and the like, and should not be set to a fixed value. Note that research by the inventors has found that the appropriate value of the low-flow-velocity area is 0.01 m$^2$ or less when the required quality level is high, and 0.02 m$^2$ or less when the required quality level is not particularly high, as a guide. The maximum molten steel surface flow velocity is an effective index because a slow flow of the molten steel at the molten steel surface produces an effect of reducing catching of the mold powder inside the molten steel 2. Furthermore, the maximum value of the molten steel surface turbulence energy is an effective index for the same reason as that of the maximum molten steel surface flow velocity.

The operation condition controller 13 controls the operation conditions, such as the casting speed, the magnetic flux density of the electromagnetic stirring magnetic field, and the nozzle submerging depth, in accordance with the molten steel flow indices to control the molten steel flow indices calculated by the molten steel flow index calculator 12 within appropriate ranges. For example, when an area of a region where the solidification interface flow velocity is equal to or less than the predetermined value exceeds a preliminarily set value, such operation condition control is exercised that the electromagnetic stirring magnetic field has an increased magnetic flux density to strengthen electromagnetic stirring force. This is because a further increase in the flow velocity of the molten steel in the mold by electromagnetic stirring force acts to increase the flow velocity of the molten steel even in a position where the solidification interface flow velocity is equal to or less than the predetermined value. Furthermore, when, even with an increase in the magnetic flux density of the electromagnetic stirring magnetic field, an area of a region where the solidification interface flow velocity is equal to or less than the predetermined value still exceeds the preliminarily set value and when the position where the solidification interface flow velocity is equal to or less than the predetermined value is in the vicinity of the molten steel surface, such operation condition control may be exercised that the depth of the submerged entry nozzle is decreased. This is because a decrease in the depth of the submerged entry nozzle allows a discharge flow of the molten steel discharged from the submerged entry nozzle to have an effect more on the molten steel surface side, which acts to increase the flow velocity of the molten steel at the molten steel surface. On the other hand, when an increase in the magnetic flux density of the electromagnetic stirring magnetic field allows an area of a region where the solidification interface flow velocity is equal to or less than the predetermined value to be less than the preliminarily set value but when the molten steel surface flow velocity and/or the molten steel surface turbulence energy exceeds predetermined values, operation condition control may be exercised such that while the magnetic flux density of the electromagnetic stirring magnetic field remains increased, the depth of the submerged entry nozzle is increased. This is because an increase in the depth of the submerged entry nozzle allows the discharge flow of the molten steel discharged from the submerged entry nozzle to have an effect less on the molten steel surface side, which acts to decrease the molten steel surface flow velocity and/or the molten steel surface turbulence energy.

Figure 3:
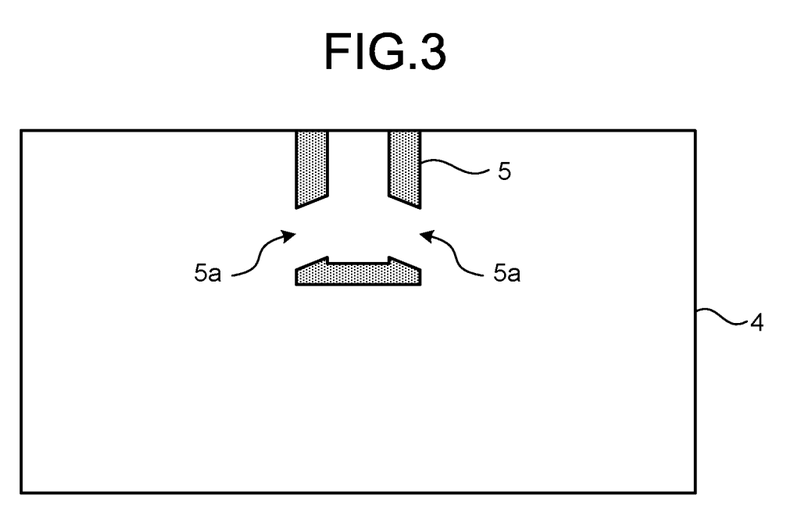
FIG. 3 is a schematic view illustrating an example configuration of a submerged entry nozzle.

The flow state of the molten steel 2 in the mold 4 typically varies in accordance with a difference in the operation state of the continuous casting machine 1. For example, as illustrated in FIG. 3, when the submerged entry nozzle 5 used has discharge ports 5a in two right and left positions, inclusions such as alumina adhering to one of the discharge ports 5a may create a difference between a right portion and a left portion (uneven flow) of the discharge flow of the molten steel 2 in the mold 4. This uneven flow is generated even under the same operation conditions, such as the casting width, the casting speed, and the magnetic flux density of the electromagnetic stirring magnetic field, so that, by accurately reproducing the flow state of the molten steel including the uneven flow using the measurement values from the temperature sensors mounted on the mold 4, the molten steel flow indices are more accurately estimated by on-line real-time system.

That is, by correcting calculation conditions for the molten steel flow index calculator 12 and successively updating calculation values to correspond to the measurement values from the temperature sensors mounted on the mold 4, the molten steel flow indices are more accurately estimated by on-line real-time system. Note that the number of the temperature sensors mounted, the pitch between the temperature sensors, and the sampling intervals of the measurement values may be set within appropriate ranges depending on the environment where the present invention is implemented and the like. Research by the inventors has found that when the temperature sensors are arranged at a pitch of 50 mm or less and a pitch of 100 mm or less respectively in the casting direction and the width direction, and when the measurement values are obtained at intervals of 1 second or less, the calculation accuracy of the molten steel flow index calculator 12 is further improved. On-line real-time system estimation of the molten steel flow indices enables the grasp of whether the operation is conducted within an appropriate range posing a low risk of the occurrence of a defect, and change in the operation conditions enables control so that the molten steel flow indices are within the appropriate ranges. As a result, a high-quality slab can be produced.

Note that in this embodiment, the low-flow-velocity area has been described as an area of a region where the solidification interface flow velocity is equal to or less than the predetermined value; however, the flow velocity for the molten steel flow index is not limited to that at the solidification interface. If a region has a low flow velocity in the flow of the molten steel generated by an electromagnetic stirring magnetic field or the like (stirred flow), that region adversely affects trapping of bubbles and inclusions in the solidification interface, and thus this may be used for the molten steel flow index. In this way, the low-flow-velocity area is not limited to an area regarding the solidification interface flow velocity and can be defined in various ways. Similarly, the maximum value of the molten steel surface flow velocity and the maximum value of the molten steel surface turbulence energy indicate states of the molten steel surface and relate to catching of the mold powder. Thus, the molten steel flow indices are not limited to these maximum values, and the speed or the flow state at the molten steel surface that are appropriately defined may be used for the molten steel flow indices.

Figure 4:
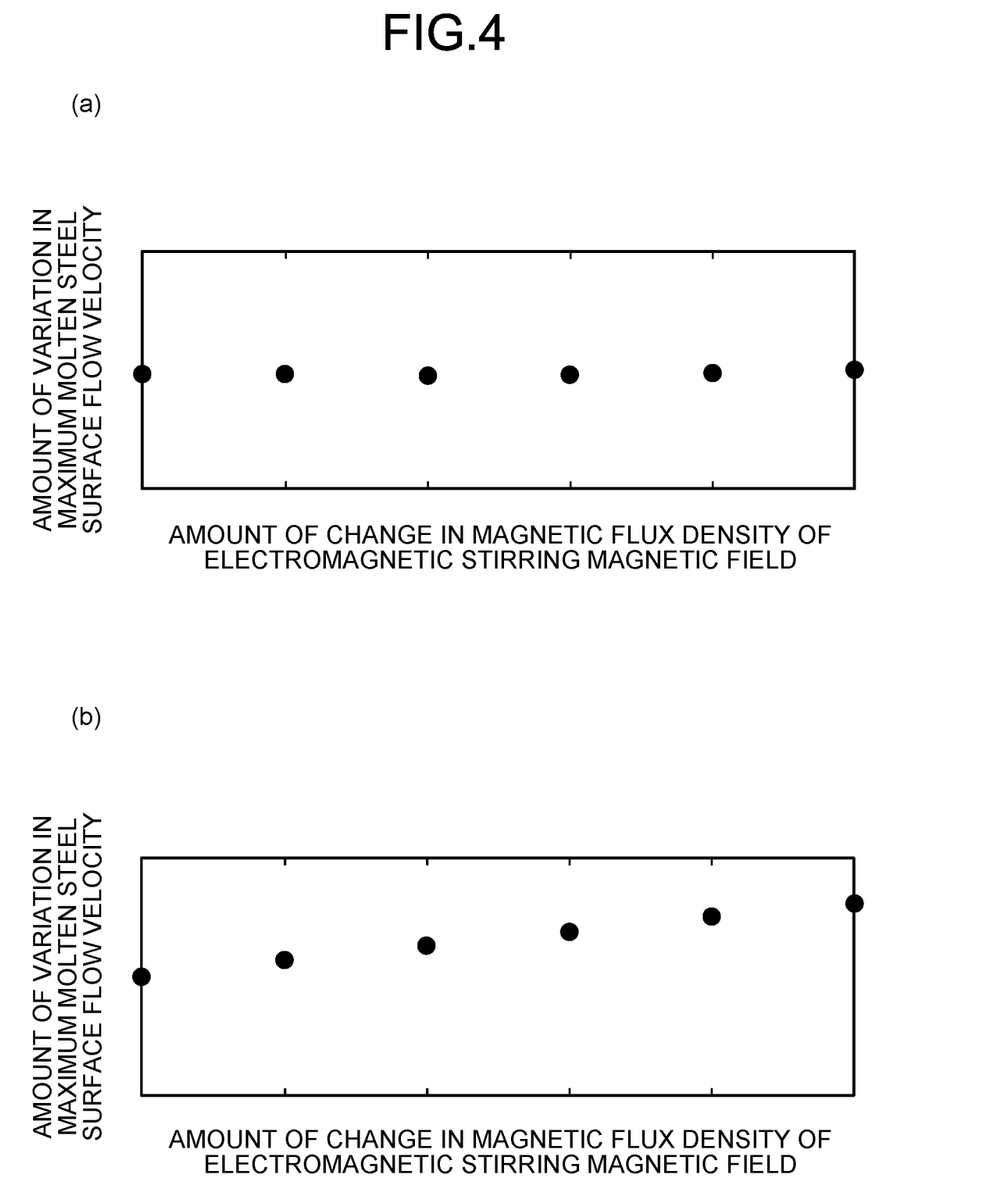
FIG. 4 is a diagram illustrating relations between the amount of change in the magnetic flux density of an electromagnetic stirring magnetic field and the amount of variation in a maximum molten steel surface flow velocity under two different conditions of the magnetic flux density of the electromagnetic stirring magnetic field.

Moreover, the molten steel flow indices are preferably controlled in consideration of the following two points. The first point is a nonlinear molten steel flow phenomenon. In other words, when original operation conditions are different, the same amount of change in an operation condition results in different amounts of variation in a molten steel flow index. FIGS. 4 (a) and 4 (b) are diagrams illustrating relations between the amount of change in the magnetic flux density of the electromagnetic stirring magnetic field and the amount of variation in the maximum molten steel surface flow velocity under two different conditions of the magnetic flux density of the electromagnetic stirring magnetic field. Under the condition illustrated in FIG. 4 (a), change in the magnetic flux density of the electromagnetic stirring magnetic field hardly varies the maximum molten steel surface flow velocity. In contrast, under the condition illustrated in FIG. 4 (b), an increase in the magnetic flux density of the electromagnetic stirring magnetic field increases the maximum molten steel surface flow velocity. Furthermore, as described above, an uneven flow may be generated in the discharge flow of the molten steel irrespective of the operation conditions. Thus, the sensitivity of variation in the molten steel flow index to the amount of change in the operation condition may vary every moment, and if the sensitivity is preliminarily set, it may be difficult to exercise control so that the molten steel flow index is within the appropriate range.

The second point is mutual interference among the operation conditions and the molten steel flow indices. For example, an increase in the casting speed decreases the low-flow-velocity area and, on the other hand, increases the maximum molten steel surface flow velocity. Furthermore, change in the submerging depth of the submerged entry nozzle can vary the maximum molten steel surface flow velocity and the maximum value of the molten steel surface turbulence energy. To exercise control so that all the molten steel flow indices are within the appropriate ranges, the control need be exercised in consideration of the interference while some operation conditions are combined. Unfortunately, if convergent calculation is used to implicitly obtain the amounts of change in the operation conditions, the calculation time is long, and dynamic control is difficult. It is thus preferable to explicitly calculate the amounts of change in the operation conditions in consideration of the interference and to reflect the calculated amounts in the operation conditions in a subsequent control cycle.

Figure 5:
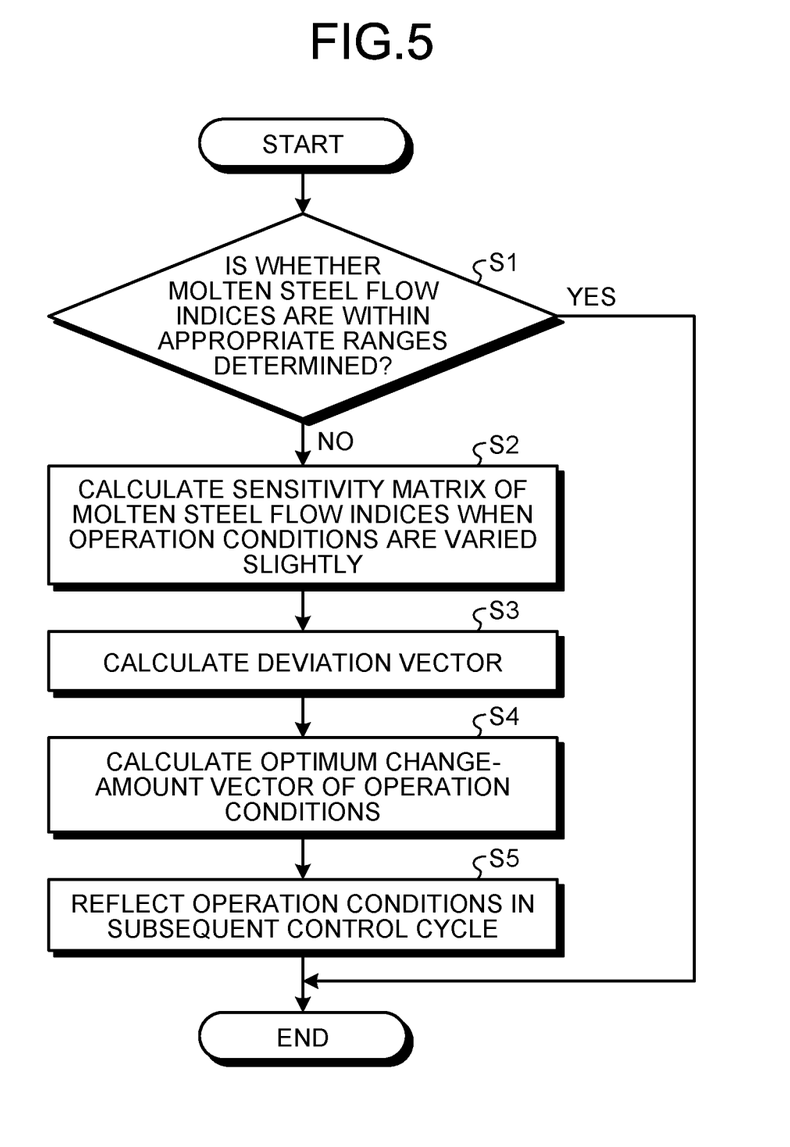
FIG. 5 is a flowchart illustrating a procedure of operation condition control processes by the control device of the continuous casting machine according to the one embodiment of the present invention.

FIG. 5 is a flowchart illustrating a procedure of operation condition control processes by the control device of the continuous casting machine according to the one embodiment of the present invention. The flowchart illustrated in FIG. 5 starts every time when the molten steel flow index calculator 12 calculates the molten steel flow indices, and the operation condition control proceeds to the process of step S1. Note that the following description is for a case where operation conditions A, B, and C are changed to control a low-flow-velocity area S, a maximum molten steel surface flow velocity V, and a maximum value E of molten steel surface turbulence energy as the molten steel flow indices.

At the process of step S1, the operation condition controller 13 determines whether all the molten steel flow indices calculated by the molten steel flow index calculator 12 are within appropriate ranges. If the result of the determination is that all the molten steel flow indices are within the appropriate ranges (Yes at step S1), the operation condition controller 13 does not change the operation conditions, and a series of the operation condition control processes ends. On the other hand, if at least one of the molten steel flow indices is outside the appropriate range (No at step S1), the operation condition controller 13 allows the operation condition control to proceed to the process of step S2.

At the process of step S2, the operation condition controller 13 estimates the flow state of the molten steel when each of the operation conditions to be manipulated is varied slightly, and calculates molten steel flow indices. Note that significant amounts of variation in the operation conditions from the original operation conditions may lower the accuracy in estimating molten steel flow distribution, so that variation within 10% from the original operation condition is preferable. The operation condition controller 13 then calculates differences between the calculated molten steel flow indices and the molten steel flow indices calculated by the molten steel flow index calculator 12 and obtains a sensitivity matrix X by calculating sensitivity vectors of the molten steel flow indices when each of the operation conditions is changed. The following equation (1) represents the sensitivity matrix X when a sensitivity vector ($\partial S/\partial A$, $\partial V/\partial A$, $\partial E/\partial A$) of the molten steel flow indices is obtained with change in the operation condition A, a sensitivity vector ($\partial S/\partial B$, $\partial V/\partial B$, $\partial E/\partial B$) of the molten steel flow indices is obtained with change in the operation condition B, and a sensitivity vector ($\partial S/\partial C$, $\partial V/\partial C$, $\partial E/\partial C$) of the molten steel flow indices is obtained with change in the operation condition C. This ends the process of step S2, and the operation condition control proceeds to the process of step S3.

$$X = \begin{pmatrix} \frac{\partial S}{\partial A} & \frac{\partial S}{\partial B} & \frac{\partial S}{\partial C} \\ \frac{\partial V}{\partial A} & \frac{\partial V}{\partial B} & \frac{\partial V}{\partial C} \\ \frac{\partial E}{\partial A} & \frac{\partial E}{\partial B} & \frac{\partial E}{\partial C} \end{pmatrix} \qquad (1)$$

At the process of step S3, the operation condition controller 13 calculates a difference value between each of the molten steel flow indices calculated by the molten steel flow index calculator 12 and the corresponding appropriate range to obtain a deviation vector Y. The following equation (2) represents the deviation vector Y when the low-flow-velocity area S, the maximum molten steel surface flow velocity V, and the maximum value E of the molten steel surface turbulence energy respectively have deviations $\Delta S$, $\Delta V$, and $\Delta E$. This ends the process of step S3, and the operation condition control proceeds to the process of step S4.

$$\vec{Y} = \begin{pmatrix} \Delta S \\ \Delta V \\ \Delta E \end{pmatrix} \qquad (2)$$

At the process of step S4, the operation condition controller 13 uses the sensitivity matrix X obtained at the process of step S2 and the deviation vector Y obtained at the process of step S3 to calculate an optimum change-amount vector Z=(ΔA, ΔB, ΔC) of the operation conditions by the least squares method. The following equation (3) represents the relation among the sensitivity matrix X, the deviation vector Y, the change-amount vector Z of the operation conditions, and an error vector ε. The least squares method is a method to obtain a change-amount vector Z with which the sum of squares of the error vector ε in the equation (3) is minimized, as an optimum solution, and the optimum change-amount vector Z of the operation conditions can be calculated by the following equation (4). In this way, the optimum change-amount vector Z of the operation conditions is explicitly calculated on the basis of the original operation conditions having known amounts and the molten steel flow indices calculated by the molten steel flow index calculator 12. This ends the process at step S4, and the operation condition control proceeds to the process at step S5.

$$\vec{Y} = X\vec{Z} + \in \quad (3)$$

$$\vec{Z} = (X^T X)^{-1} X^T \vec{Y} \quad (4)$$

At the process of step S5, the operation condition controller 13 reflects the optimum change-amount vector Z=(ΔA, ΔB, ΔC) of the operation conditions obtained at the process of step S4 in the operation conditions and sets the reflected conditions as the operation conditions in a subsequent control cycle. In specific, the operation condition controller 13 uses operation conditions A+ΔA, B+ΔB, and C+ΔC in the subsequent control cycle. This ends the process of step S5, and a series of the operation condition control processes ends.

EXAMPLES

Figure 6:
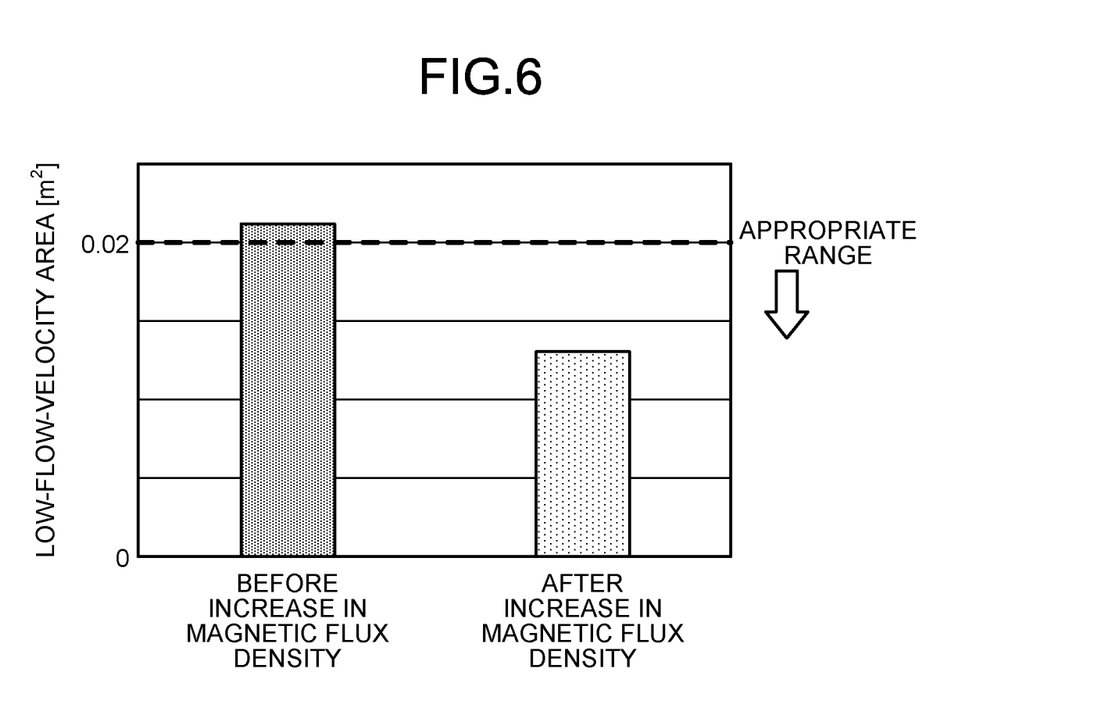
FIG. 6 is a diagram illustrating example variation in a low-flow-velocity area with variation in the magnetic flux density of the electromagnetic stirring magnetic field.
Figure 7:
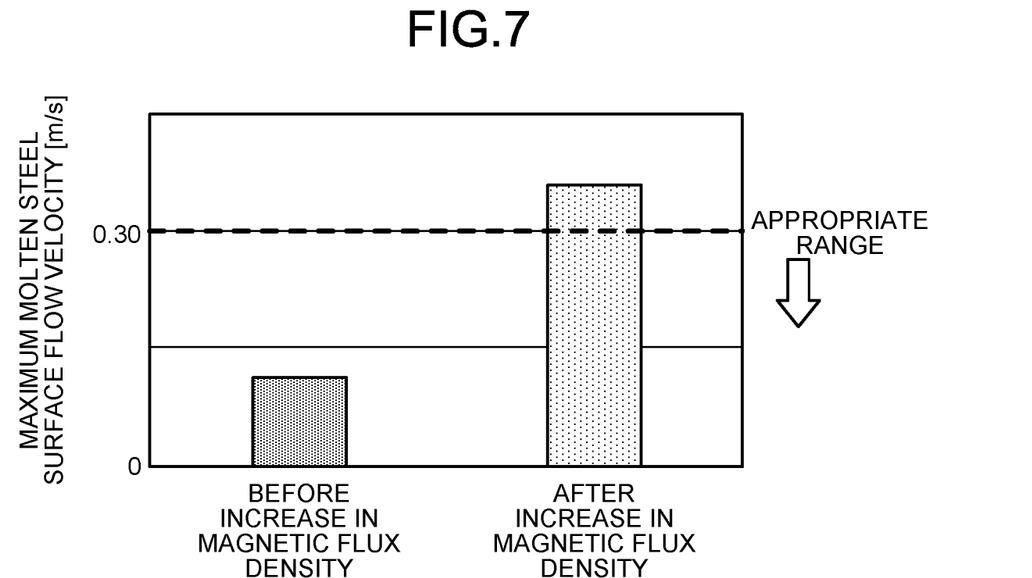
FIG. 7 is a diagram illustrating example variation in the maximum molten steel surface flow velocity with variation in the magnetic flux density of the electromagnetic stirring magnetic field.
Figure 8:
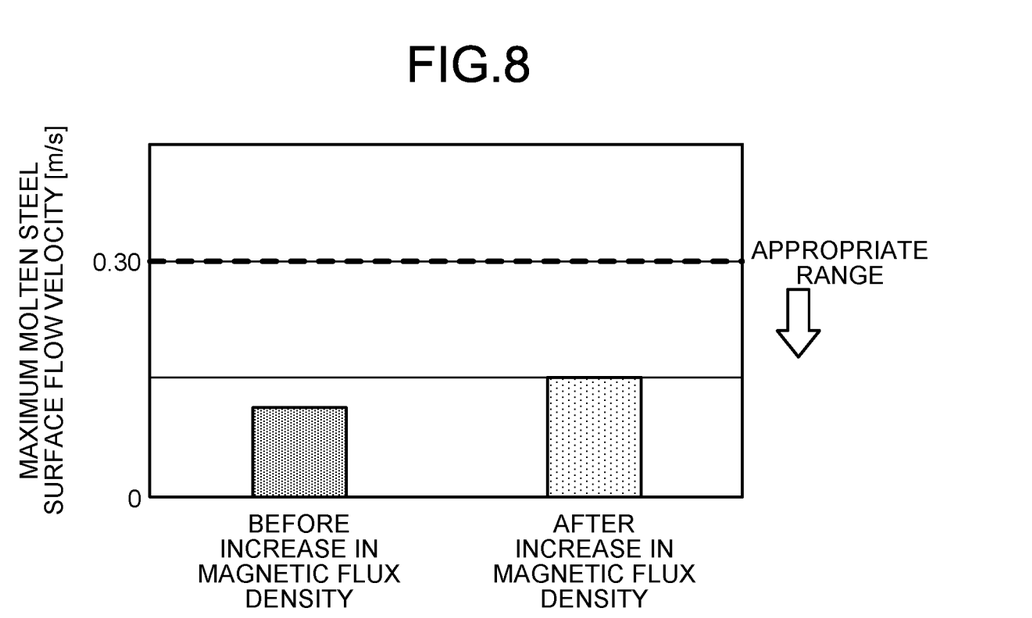
FIG. 8 is a diagram illustrating example variation in the maximum molten steel surface flow velocity with variation in the magnetic flux density of the electromagnetic stirring magnetic field and a nozzle submerging depth.
Figure 9:
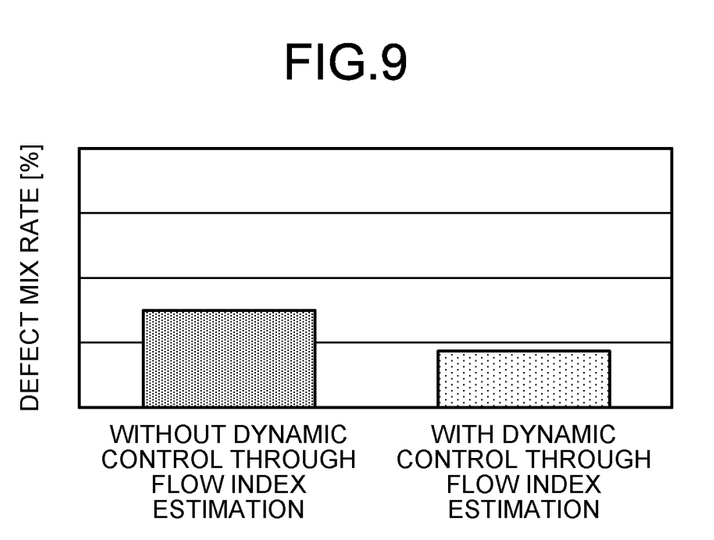
FIG. 9 is a diagram illustrating example variation in a defect mix rate of a slab with and without control of operation conditions.

As an example, the present invention was applied to continuous casting of ultra low carbon steel. The mold has a width of 1200 mm and a thickness of 260 mm, and the casting speed in a steady state is 1.6 m/min. In this example, operation was conducted with the appropriate range of the low-flow-velocity area set to 0.02 m² or less and the appropriate range of the maximum molten steel surface flow velocity set to 0.05 to 0.30 m/s. During the operation, the low-flow-velocity area calculated in operation of the continuous casting machine 1 exceeded the appropriate range, and thus the magnetic flux density of the electromagnetic stirring magnetic field was increased by 5%. As a result, as illustrated in FIG. 6, the stirring force of the molten steel in the mold 4 increased, which increased the solidification interface flow velocity and decreased the low-flow-velocity area. Unfortunately, the increase in the stirring force of the molten steel due to this change in the operation condition caused the maximum molten steel surface flow velocity to exceed the appropriate range as illustrated in FIG. 7 in some cases. Then, the nozzle submerging depth was increased by 30 mm. This is because the discharge flow from the submerged entry nozzle 5 collides with the mold copper plate and is reversed, and the reversed flow overlaps the stirred flow, increasing the molten steel surface flow velocity, so that an increase in the submerging depth of the submerged entry nozzle 5 diminishes the reversed flow and can thus reduce the molten steel surface flow velocity. This change in the operation condition enabled control so that the maximum molten steel surface flow velocity is within the appropriate range as illustrated in FIG. 8, while reducing the low-flow-velocity area. Furthermore, on-line real-time system estimation of the molten steel flow indices (maximum molten steel surface flow velocity, low-flow-velocity area, and maximum value of molten steel surface turbulence energy) enabled control of the operation conditions so that the molten steel flow indices are within the appropriate ranges. As a result, as illustrated in FIG. 9, the defect mix rate of a slab, which is a slab quality index, was reduced. In this way, it was confirmed that the control method for the continuous casting machine according to the present invention enabled production of a slab having excellent quality.

Figure 10:
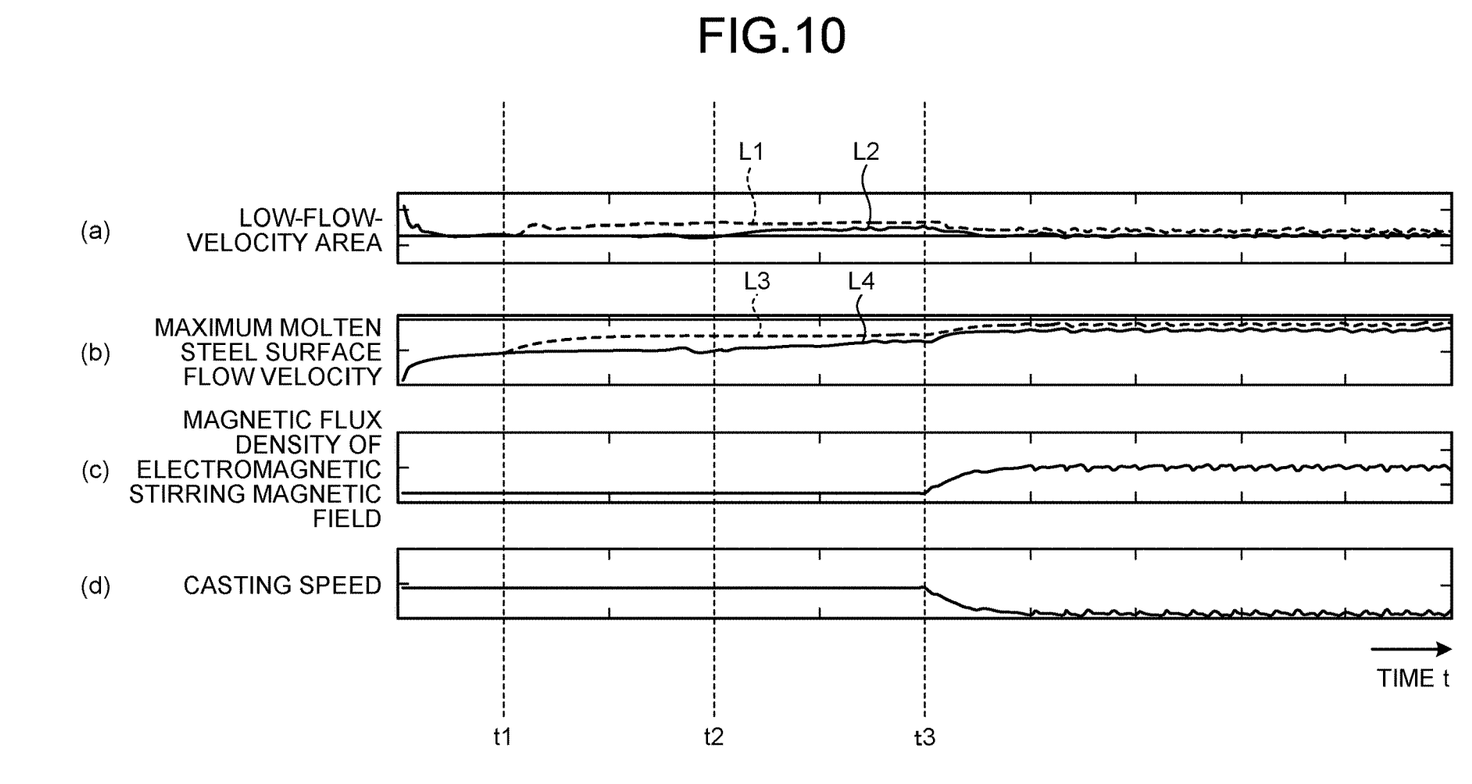
FIG. 10 is a timing chart illustrating an example of the operation condition control processes.

In an example illustrated in FIGS. 10 (*a*) to 10 (*d*), a virtual plant having artificial disturbance causing the submerged entry nozzle to be clogged was generated in simulation, and it was confirmed whether the control device of the continuous casting machine according to the one embodiment of the present invention enabled control so that the low-flow-velocity area and the maximum molten steel surface flow velocity calculated in the virtual plant are within appropriate ranges by manipulation of the magnetic flux density of the electromagnetic stirring magnetic field and the casting speed. When the disturbance was caused at time t=t1 illustrated in FIGS. 10 (*a*) to 10 (*d*), estimated errors occurred between the low-flow-velocity area and the maximum molten steel surface flow velocity calculated by the molten steel flow index calculator 12 and the low-flow-velocity area and the maximum molten steel surface flow velocity in the virtual plant. Next, when the molten steel flow state estimating process was started at time t=t2 illustrated in FIGS. 10 (*a*) to 10 (*d*), the estimated errors between the low-flow-velocity area and the maximum molten steel surface flow velocity calculated by the molten steel flow index calculator 12 and the low-flow-velocity area and the maximum molten steel surface flow velocity in the virtual plant were reduced. Then, when the operation condition controlling process was started at time t=t3 illustrated in FIGS. 10 (*a*) to 10 (*d*), the magnetic flux density of the electromagnetic stirring magnetic field was increased, the casting speed was reduced, and the low-flow-velocity area and the maximum molten steel surface flow velocity in the virtual plant were controlled to the vicinities of the upper limits of the appropriate ranges. From the above, it was confirmed that on-line real-time system estimation of the molten steel flow indices (maximum molten steel surface flow velocity, low-flow-velocity area, and maximum value of molten steel surface turbulence energy) enabled control of the operation conditions so that the molten steel flow indices are within the appropriate ranges whenever needed and that production of a high-quality slab was enabled. Note that in FIGS. 10 (*a*) to 10 (*d*), the broken line L1 indicates the low-flow-velocity area in the virtual plant, the line L2 indicates the low-flow-velocity area calculated by the molten steel flow index calculator 12, the broken line L3 indicates the maximum molten steel surface flow velocity in the virtual plant, and the line L4 indicates the maximum molten steel surface flow velocity calculated by the molten steel flow index calculator 12.

The embodiment to which the invention made by the inventors is applied has been described; however, the description of the present embodiment and drawings serving as part of the disclosure of the present invention should not be construed to limit the present invention. For example, in the example illustrated in FIGS. 10 (*a*) to 10 (*d*), the case where the magnetic flux density of the electromagnetic stirring magnetic field and the casting speed are manipulated has been examined; however, the flow indices, such as the low-flow-velocity area, the molten steel surface flow velocity, and the molten steel surface flow turbulence energy, may be controlled by manipulation of the magnetic flux density of the electromagnetic stirring magnetic field. In this way, other embodiments, examples, operation techniques, and the like that may be implemented by those skilled in the art or the like on the basis of this embodiment are all included within the scope of the present invention.

INDUSTRIAL APPLICABILITY

According to the present invention, a control method for a continuous casting machine, a control device for a continuous casting machine, and a manufacturing method for a casting that enable production of high-quality castings can be provided.

REFERENCE SIGNS LIST

1 CONTINUOUS CASTING MACHINE
2 MOLTEN STEEL
3 TUNDISH
4 MOLD
5 SUBMERGED ENTRY NOZZLE
10 CONTROL DEVICE
11 MOLTEN STEEL FLOW STATE ESTIMATOR
12 MOLTEN STEEL FLOW INDEX CALCULATOR
13 OPERATION CONDITION CONTROLLER

The invention claimed is:

1. A control method for a continuous casting machine, comprising:
estimating, by an on-line real-time system, a flow state of molten steel in a mold by using:
an operation condition of a continuous casting machine, and
temperature data on the molten steel in the mold;
calculating, by the on-line real-time system, at least one molten steel flow index based on the estimated flow state of the molten steel, the at least one molten steel flow index being a factor of mixing of an impurity into a casting inside the mold; and
controlling the operation condition of the continuous casting machine such that the at least one calculated molten steel flow index is within an appropriate range,
wherein the at least one molten steel flow index includes a maximum value of molten steel surface flow velocities in the mold, an area of a region where a solidification interface flow velocity is equal to or less than a predetermined value, and a maximum value of a molten steel surface turbulence energy, and
the maximum value of the molten steel surface turbulence energy is calculated according to formulas (I) and (II) below:

$$k = (1/2) \cdot U_i^2 \qquad (I)$$

$$U = U_{ave} + U_i \qquad (II)$$

where k is turbulence energy, U is an instantaneous value of a flow velocity of a fluid in a spatial position, $U_{ave}$ is a time average value of the flow velocity of the fluid in the spatial position, and $U_i$ is a deviation from a time average value of the flow velocity of the fluid in the spatial position.

2. The control method for the continuous casting machine according to claim 1, wherein the at least one molten steel flow index includes an area of a region where the flow velocity is equal to or less than a predetermined value in a stirred flow generated by an electromagnetic stirring magnetic field.

3. The control method for the continuous casting machine according to claim 2, wherein the at least one molten steel flow index includes a speed or a flow state at a surface of the molten steel.

4. The control method for the continuous casting machine according to claim 2, wherein the temperature data on the molten steel in the mold is temperature data including a measurement value from a temperature sensor mounted on the mold.

5. The control method for the continuous casting machine according to claim 2, wherein the operation condition of the continuous casting machine includes at least one of a casting speed, magnetic flux density of the electromagnetic stirring magnetic field, and a nozzle submerging depth.

6. The control method for the continuous casting machine according to claim 5, wherein the controlling includes calculating sensitivity of the flow state of the molten steel with respect to change in the operation condition by estimating, for each control cycle, the flow state of the molten steel when at least one of the casting speed, the magnetic flux density of the electromagnetic stirring magnetic field and the nozzle submerging depth is varied slightly.

7. The control method for the continuous casting machine according to claim 6, wherein the controlling includes performing control by explicitly calculating mutual interference among the casting speed, the magnetic flux density of the electromagnetic stirring magnetic field, and the nozzle submerging depth.

8. The control method for the continuous casting machine according to claim 5, wherein the controlling includes performing control by explicitly calculating mutual interference among the casting speed, the magnetic flux density of the electromagnetic stirring magnetic field, and the nozzle submerging depth.

9. The control method for the continuous casting machine according to claim 1, wherein the at least one molten steel flow index includes a speed or a flow state at a surface of the molten steel.

10. The control method for the continuous casting machine according to claim 1, wherein the maximum value of molten steel surface flow velocities in the mold is calculated by determining a maximum value of the molten steel flow velocities in a meniscus portion of the molten steel in the mold.

11. The control method for the continuous casting machine according to claim 1, wherein the area of the region where the solidification interface flow velocity is equal to or less than the predetermined value is calculated by, for each long side of the mold, summing areas of the molten steel where the molten steel flow velocity is equal to or less than the predetermined value in an entire region in a width direction and at least in a range from a meniscus position to a depth of 200 mm in a mold height direction.

12. A control device for a continuous casting machine, comprising a processor comprising hardware, the processor being configured to:
estimate, by an on-line real-time system, a flow state of molten steel in a mold by using:
an operation condition of a continuous casting machine, and
temperature data on the molten steel in the mold;
calculate, by the on-line real-time system, at least one molten steel flow index based on the estimated flow state of the molten steel, the at least one molten steel flow index being a factor of mixing of an impurity into a casting inside the mold; and control the operation condition of the continuous casting machine such that the at least one calculated molten steel flow index is within an appropriate range, wherein the at least one molten steel flow index includes a maximum value of molten steel surface flow velocities in the mold, an area of a region where a solidification interface flow velocity is equal to or less than a predetermined value, and a maximum value of a molten steel surface turbulence energy, and the maximum value of the molten steel surface turbulence energy is calculated according to formulas (I) and (II) below:

$$k=(1/2) \cdot U_i^2 \quad \text{(I)}$$

$$U=U_{ave}+U_i \quad \text{(II)}$$

where k is turbulence energy, U is an instantaneous value of a flow velocity of a fluid in a spatial position, $U_{ave}$ is a time average value of the flow velocity of the fluid in the spatial position, and $U_i$ is a deviation from a time average value of the flow velocity of the fluid in the spatial position.

13. A manufacturing method for a casting, comprising producing a casting while controlling a continuous casting machine by using a control method for the continuous casting machine, including:

estimating, by an on-line real-time system, a flow state of molten steel in a mold by using:
  an operation condition of a continuous casting machine, and
  temperature data on the molten steel in the mold;

calculating, by the on-line real-time system, at least one molten steel flow index based on the estimated flow state of the molten steel, the at least one molten steel flow index being a factor of mixing of an impurity into a casting inside the mold; and controlling the operation condition of the continuous casting machine such that the at least one calculated molten steel flow index is within an appropriate range, wherein the at least one molten steel flow index includes a maximum value of molten steel surface flow velocities in the mold, an area of a region where a solidification interface flow velocity is equal to or less than a predetermined value, and a maximum value of a molten steel surface turbulence energy, and the maximum value of the molten steel surface turbulence energy is calculated according to formulas (I) and (II) below:

$$k=(1/2) \cdot U_i^2 \quad \text{(I)}$$

$$U=U_{ave}+U_i \quad \text{(II)}$$

where k is turbulence energy, U is an instantaneous value of a flow velocity of a fluid in a spatial position, $U_{ave}$ is a time average value of the flow velocity of the fluid in the spatial position, and $U_i$ is a deviation from a time average value of the flow velocity of the fluid in the spatial position.

14. The manufacturing method for the casting according to claim 13, wherein the at least one molten steel flow index includes an area of a region where the flow velocity is equal to or less than a predetermined value in a stirred flow generated by an electromagnetic stirring magnetic field.

* * * * *